(12) United States Patent
Fabricius et al.

(10) Patent No.: US 7,137,490 B2
(45) Date of Patent: Nov. 21, 2006

(54) FRICTION-LINING SEGMENT, FRICTION LINING AND PROCESS FOR ITS MANUFACTURE

(75) Inventors: Emilio Fabricius, Oftersheim (DE); Markus Otremba, Schwetzingen (DE); Meike Lenk, Gernsheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/690,381

(22) Filed: Oct. 21, 2003

(65) Prior Publication Data

US 2004/0079595 A1    Apr. 29, 2004

(30) Foreign Application Priority Data

Oct. 23, 2002   (DE) .................. 02023564

(51) Int. Cl.
    *F16D 65/04* (2006.01)
(52) U.S. Cl. .................. 188/250 D; 188/218 XL
(58) Field of Classification Search ......... 188/218 XL, 188/251 A, 73.2, 17, 26, 250 D; 192/107 R; 428/212
    See application file for complete search history.

(56) References Cited

U.S. PATENT DOCUMENTS

| | | | | |
|---|---|---|---|---|
| 2,144,831 A * | 1/1939 | Burns | ...................... | 192/107 R |
| 3,397,760 A * | 8/1968 | Robins et al. | .......... | 192/107 R |
| 3,605,968 A * | 9/1971 | Ely | ........................ | 192/107 R |
| 4,007,814 A * | 2/1977 | Berger | .................. | 188/218 XL |
| 4,260,047 A | 4/1981 | Nels | | |
| 4,280,608 A | 7/1981 | LaBuda et al. | | |
| 4,280,609 A | 7/1981 | Cruise | | |
| 4,730,713 A | 3/1988 | Pickard et al. | | |
| 4,747,473 A * | 5/1988 | Bok et al. | .................. | 188/73.2 |
| 5,332,075 A | 7/1994 | Quigley et al. | | |
| 5,585,166 A * | 12/1996 | Kearsey | ...................... | 428/212 |
| 5,713,450 A * | 2/1998 | Quigley | .................. | 192/107 R |
| 5,989,375 A * | 11/1999 | Bortz | ...................... | 188/251 A |
| 6,013,696 A | 1/2000 | Hill et al. | | |
| 6,035,991 A | 3/2000 | Willwerth et al. | | |
| 6,170,629 B1 | 1/2001 | Suzuki et al. | | |
| 6,585,096 B1 * | 7/2003 | Fujita | ...................... | 192/107 R |
| 2002/0043441 A1 | 4/2002 | Fujita | | |

FOREIGN PATENT DOCUMENTS

| EP | 0 521 843 B1 | 3/1996 |
|---|---|---|
| EP | 0 771 962 A2 | 5/1997 |
| EP | 0 848 177 A1 | 6/1998 |

OTHER PUBLICATIONS

EP Search Report for Ep02023564.4 (priority document) corresponding to U.S. Appl. No. 10/690,381.

* cited by examiner

*Primary Examiner*—Melanie Torres
(74) *Attorney, Agent, or Firm*—Emch, Schaffer, Schaub & Porcello, Co.; Greg Dziegielewski

(57) ABSTRACT

A segmented friction lining of a friction plate for a brake; or clutch having a lock mechanism on one end and a lock counter-mechanism complementary to the lock mechanism on the other end. To ensure that the stress on the respective junction points is relieved along the connecting edges, one or several holes are built into the friction lining in the vicinity of the lock. The holes can be milled into the lining (33).

12 Claims, 2 Drawing Sheets

Fig. 5 (Stand der Technik)   Fig. 4
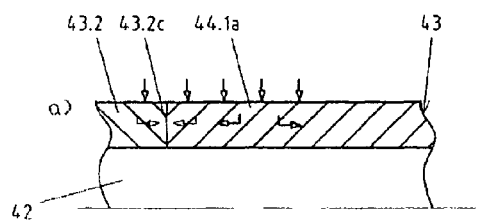
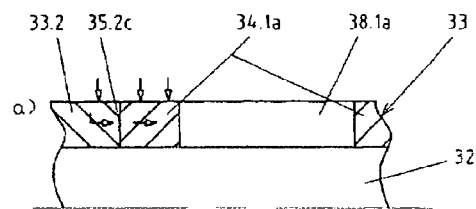
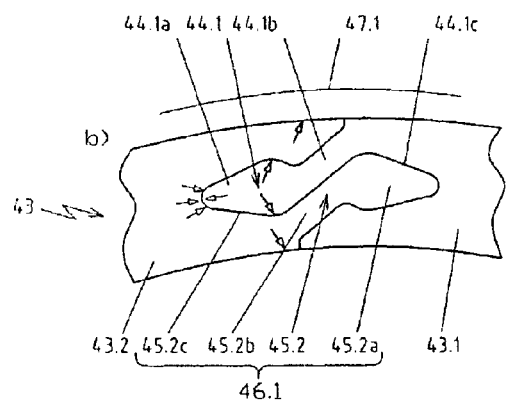
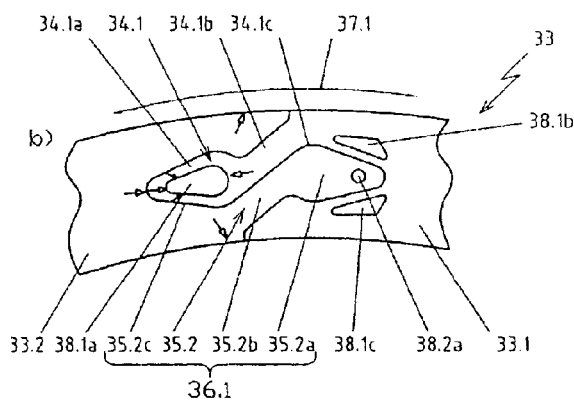

FRICTION-LINING SEGMENT, FRICTION LINING AND PROCESS FOR ITS MANUFACTURE

The patent relates to a friction-lining segment in accordance with the preamble of Claim 1, a friction lining in accordance with the preamble of claim 8, and a process for manufacturing friction-lining segments in accordance with the preamble of claim 12.

Brake and clutch devices, like those in documents DE 2854051 A1, U.S. Pat. No. 4,280,609, and DE 3532759 C1, describe multi-disc clutches from which the invention proceeds and which the following will refer to. They are based on two or more friction plates, which are generally called discs and preferably have a basically annular shape. A first group of these discs, the external discs, are arranged on an external disc carrier that is connected to a first shaft, a drive shaft for example, and a second group of these discs, the internal discs, are arranged on an internal disc carrier that is connected to a second shaft, an output shaft for example. The discs of both groups engage each other gear-tooth-like forming a disc pack, each external disc being arranged adjacent to an internal disc. External discs and internal discs can be displaced to each other to some extent in the axial direction, their end faces touching each other thereby being in frictional engagement pairwise (i.e. transmitting a torque from the drive shaft to the output shaft), and they can be brought out of frictional engagement.

Some of these discs comprise of a carrier, preferably metallic, which supports a friction lining, usually manufactured of fibrous material or the like, on one or both basically annular end faces.

For an example, please refer to the detailed descriptions in the aforementioned patent documents.

Friction linings of the aforementioned art were originally implemented as one integral piece. Meanwhile it has become customary to compose these friction linings out of a plurality of separate friction-lining segments in order to save material.

Examples of friction linings comprising of a plurality of friction-lining segments are known from EP 0521843 A1. On an end adjacent to an adjoining friction-lining segment, each friction-lining segment of a friction lining segmented in this manner usually demonstrates a clip that engages a matching complementary groove built into the end of its adjoining friction-lining segment. This produces an essentially unalterable connection between adjoining friction-lining segments, even when working pressure is applied. In technical terminology, this essentially unalterable connection is called "lock."

Although segmented friction linings with this type of connection to adjoining friction-lining segments have proven themselves in principle, it is possible for damage to occur at the junction point, whereas this type of damage cannot occur in unsegmented friction linings. The damage to the junction point can be traced to the occurrence of notches on the junction points of the friction lining. Loose projecting fibers of the friction material easily result in notches, especially at the respective ends of the friction-lining segments.

To prevent hasty destruction of the friction layer, DE 69701946 T2 proposes that the outside contour of the clip not follow the exact geometric shape of the inside contour of the groove, but that a storage space for the accommodation of coolant and stray fiber be formed between their boundaries. This effects a dissipation and distribution of the heat that is generated in the center of the clip and groove junction joint in the (closed-loop) operation.

It has been shown that this measure indeed results in a substantial reduction of wear, but that the service lives of unsegmented linings nevertheless remain unachieved.

The invention is based on the problem of elaborating and further developing the known friction-lining segments so that the wear of segmented friction linings in the lock vicinity is further reduced. It shall moreover present a process that permits this type of improved friction-lining segment and corresponding friction linings to be produced.

For a friction-lining segment of the generic art, this problem is solved according to invention through the characteristics of the characterizing portion of claim 1. A friction lining according to invention of the generic art results from a generic friction lining through the characteristics of the characteristic portion of claim 8. The characteristics of claim 12 offer a process according to invention.

Advantageous embodiments and further developments of the invention are given in the dependent claims.

The invention proceeds quite generally from a friction-lining segment for a segmented friction lining of a friction plate for a brake, a clutch or the like that features, on at least one end, a lock mechanism which connects to a lock counter-mechanism of another friction-lining segment in a manner corresponding to the above description, the lock counter-mechanism being of basically geometrically complementary design.

On the other end, the friction-lining segment from which the invention proceeds in general features a lock counter-mechanism having a basically geometrically complementary design to the lock mechanism, so that it is possible to fit together a conventionally annular friction lining out of a plurality of this type of friction-lining segments having the same geometric shape and conventionally designed in the shape of a ring-segment. These lock mechanisms and lock counter-mechanisms help to hold adjoining friction-lining segments together, forming so-called locks.

The invention relates not only to the ideal embodiment of friction-lining segments with lock mechanism and complementary lock counter-mechanism described above, but also includes friction-lining segments that feature a lock mechanism on one end and a differently shaped (not complementary to the lock mechanism) lock counter-mechanism or even another lock mechanism on the other end.

It is provided according to invention that, in a vicinity of the lock mechanism and/or in a vicinity of the lock counter-mechanism, a hole or a plurality of holes be built into the friction-lining segments. With this measure, it was possible to significantly increase the maximum service life of clutch or brake devices with friction plates having segmented friction linings based on this type of friction-lining segments. This can be attributed to the fact that these holes allow the stress on the lining to be relieved on the respective adjoining edges of adjacent friction-lining segments when load is applied. The service life of this type of segmented lining is consequently nearly identical to that of an unsegmented lining.

A particularly advantageous embodiment variant of the invention consists of the lock mechanism and/or the lock counter-mechanism demonstrating a clip in which at least one hole is provided. This variant is based on embodiments of friction-lining segments that are known in their own right.

For friction-lining segments in which the clip demonstrates a neck and a head, it is provided according to invention that a hole be located in the head. This hole will preferably demonstrate a geometrical shape that essentially corresponds to the outside contour of the head.

It has proven particularly advantageous for the head to be designed essentially rhombic (crocodilic). Here it is sufficient for the geometric shape of the hole to approximate the rhombic shape to the extent that its outside contour has the shape of an ellipse.

It is further provided according to invention, that the lock mechanism and/or lock counter-mechanism demonstrate a groove, and that at least one hole be provided in the vicinity bordering the groove.

The best results in reference to the locking characteristics were then achieved when the depth of the holes built into the lining extend over the entire thickness of the friction lining. Under certain circumstances (e.g. for reasons of stability), it may indeed be expedient to implement the holes as blind holes.

The holes are built according to invention by means of milling, punching, or cutting into the friction-lining segments of the art described above.

Finally, it is provided according to invention, that the lock mechanisms and/or lock counter-mechanisms on the friction-lining segments be punched or cut essentially perpendicular to the direction of the fibers of the lining.

Diverse exemplary embodiments of the invention are illustrated in the drawing and will be described in detail below. The drawing shows:

FIG. 1 a top view of a first exemplary embodiment of a friction plate having a segmented friction lining developed according to invention;

FIG. 2 a top view of a fragment of a second exemplary embodiment of a segmented friction lining developed according to invention;

FIG. 3 a top view of a fragment of a third exemplary embodiment of a segmented friction lining developed according to invention;

FIG. 4a) a peripheral cross section of a fragment of a fourth exemplary embodiment of a segmented friction lining developed according to invention;

FIG. 4b) a top view of a fragment of the fourth exemplary embodiment, illustrated in FIG. 4a), of a segmented friction lining developed according to invention;

FIG. 5a) a peripheral cross section of a fragment of a segmented friction lining in accordance with the state of the art, in which the geometrical shape of the lock of the friction-lining segments is chosen identical to the lock of the fourth exemplary embodiment which is developed according to invention and illustrated in FIGS. 4a) and 4b);

FIG. 5b) a top view of a fragment of the segmented friction lining illustrated in FIG. 5a) in accordance with the state of the art;

FIG. 1 shows a friction plate or disc 1 having a segmented friction lining 3 improved according to invention. The disc 1 demonstrates an essentially annular shape.

It comprises of an essentially annular metallic carrier 2 having an internal gearing (of course an external gearing is a possible alternative), whose end face facing the observer is provided with a large-surface having an annular friction lining 3.

The annular friction lining 3 on the end face of carrier 2 comprises of three (alternatively, any odd number is possible) separate friction-lining segments 3.1, 3.2, and 3.3. All three friction-lining segments 3.1, 3.2, and 3.3 form ring segments with congruent geometrical shape. Each pair of friction-lining segments, 3.1 and 3.2, 3.2 and 3.3, and 3.3 and 3.1 respectively, touch each other on one end and thereby form an essentially closed ring.

The respective adjoining ends of adjacent friction-lining segments 3.1 and 3.2, 3.2 and 3.3, and 3.3 and 3.1 are implemented complementary to each other in such a manner that they each form tight connections between the adjoining friction-lining segments 3.1 and 3.2, 3.2 and 3.3, and 3.3 and 3.1 respectively, which in technical terminology are called locks 6.1, 6.2, and 6.3.

Hereinafter we will call each end of a friction-lining segment 3.1, 3.2, and 3.3 the lock mechanism, and we will call the other end of the friction-lining segment 3.1, 3.2, and 3.3, which as a rule is designed complementary to the lock mechanism, the lock counter-mechanism.

The respective lock mechanisms presently demonstrate the shape of a clip 4.1, 4.2, and 4.3. Accordingly the lock counter-mechanisms are in the form of a groove 5.1, 5.2, and 5.3. The respective clips 4.1, 4.2, 4.3 and grooves 5.2, 5.3, 5.1 consequently each form a lock 6.1, 6.2, 6.3.

In the exemplary embodiment illustrated in FIG. 1, the respective clips 4.1, 4.2 and 4.3 are designed oblong. They each demonstrate a head section and a narrower neck section. The geometric shape of the respective grooves 5.1, 5.2, and 5.3 are selected in such a manner that they can accommodate the clips 4.1, 4.2 and 4.3. The respective grooves 5.1, 5.2, and 5.3 extend further in the peripheral direction so that hollow spaces are formed at the respective ends of the head sections of clips 4.1, 4.2, and 4.3, these hollow spaces being called storage spaces 9.1, 9.2, 9.3 in conformity with DE 69701946 T2.

In addition to these storage spaces 9.1, 9.2, 9.3, other openings 8.1, 8.2, and 8.3 that form hollow spaces are provided according to invention in the respective lock vicinities 7.1, 7.2, and 7.3. These openings 8.1, 8.2, 8.3 or holes are presently built into the respective clips 4.1, 4.2, 4.3. This increases the elasticity of the respective lock 6.1, 6.2, 6.3.

FIG. 2 shows a fragment of a second exemplary embodiment of a segmented friction lining 13 designed according to invention.

Let us assume that the friction lining 13, in accordance with the exemplary embodiment described above, is a component of a disc having an essentially annular shape which engages an essentially annular metallic carrier having an internal or external gearing, at least one end face of the carrier being provided with a large-surface having the annular friction lining 13 in conformity with the variant presented above.

The annular end face 13 on the end face of the carrier comprises of several separate friction-lining segments 13.1, 13.2, two of which are fragmentarily depicted in the drawing. In conformity with the embodiment variant described above according to FIG. 1, the friction-lining segments 13.1, 13.2 form ring segments with congruent geometric shape. Each pair of friction-lining segments 13.1 and 13.2, as indicated in outline, adjoin each other at the end, thereby forming an essentially closed ring.

Here too, the respective adjoining ends of adjacent friction-lining segments 13.1 and 13.2 adjoining each other are complementary to each other, forming lock mechanisms and lock counter-mechanisms respectively.

Similarly as in the case of the first exemplary embodiment in accordance with FIG. 1, the respective lock mechanisms here too demonstrate the shape of a clip 14.1. Accordingly the respective lock counter-mechanisms are in the form of a groove 15.2. The clip 14.1, illustrated exemplarily in the drawing in accordance with FIG. 2, and the groove 15.2 engaging it form a lock 16.1.

In the illustrated exemplary embodiment, the clip 14.1 features a head section and a narrower neck section. In the figure, the essentially circular head and the neck connecting it with the remaining friction-lining segment 13.1 are indicated by reference characters 14.1a and 14.1b, respectively.

A hollow space is provided according to invention in the lock vicinity 17.1 depicted here. This circular hollow space, which will be called a hole here and below, is labeled with the reference character 18.1 in FIG. 2. This hole 18.1 passes centrally through the head 14.1a.

FIG. 3 shows a fragment of a third exemplary embodiment of a segmented friction lining 23 developed according to invention.

This friction lining 23 is a component of a disc in conformity with the second exemplary embodiment described above and is also designed essentially identically.

The fragment in accordance with FIG. 3 exemplarily shows the lock vicinity 27.1 of two adjacent friction-lining segments 23.1 and 23.2.

The lock mechanism of the first friction-lining segment 23.1 is developed in accordance with the exemplary embodiment described above, namely in the form of a clip 24.1 with a circular head 24.1a and a neck 24.1b connecting it to the end of friction-lining segment 23.1.

The lock counter-mechanism of the second friction-lining segment 23.2 whose end adjoins the first friction-lining segment 23.1 is accordingly designed complementary in the form of a groove 25.2, which in FIG. 3 engages the clip 24.1 with positive fit, forming a lock 26.1.

The exemplary embodiments in accordance with FIGS. 2 and 3 differ only in that the head 14.1a of the clip 14.1 of the first friction-lining segment 23.1 of the first embodiment demonstrates a hole 18.1, whereas in the latter embodiment two holes 28.1a and 28.1b are built or molded into the lock counter-mechanism of the second friction-lining segment 23.2 near the head. Both embodiments are suitable for increasing the elasticity of the lining in the lock vicinity 17.1 or 27.1 respectively, in such a manner that the mechanical stress of the lining is significantly reduced in this vicinity when it is under load, the result being that the service life of the segmented linings nearly corresponds to that of unsegmented linings.

FIG. 4 shows a fragment of a fourth preferred exemplary embodiment of a friction plate with segmented friction lining 33 developed according to invention. In comparison, FIG. 5 shows a fragment of a friction plate according to the state of the art which, except for the development according to invention, is designed identical to the friction plate illustrated in FIG. 4.

The two friction plates, which are only illustrated fragmentarily here, each demonstrate an essentially annular shape.

They comprise of an essentially annular metallic carrier 32, 42 and a likewise annular friction lining 33, 43, each of which is attached to an end face of the carriers 32, 42, preferably by gluing.

The annular friction linings 33, 43 comprise of a plurality of friction-lining segments, two of which are fragmentarily illustrated in FIGS. 4a) and b) and in 5a) and b) as examples. The illustrated friction-lining segments bear the reference characters 33.1, 33.2 and 43.1, 43.2.

All friction-lining segments (including those not drawn here), 33.1 and 33.2, and 43.1 and 43.2 respectively, form ring segments with congruent geometrical shape. Each pair of ring-lining segments, 33.1 and 33.2, and 43.1 and 43.2 respectively, adjoin each other on the end thereby forming an essentially closed ring.

The respective ends of the adjacent friction-lining segments, 33.1 and 33.2, and 43.1 and 43.2 respectively, adjoining each other are designed complementary to each other in such a manner that they each form firm connections (locks) 36.1, 46.1 between the adjoining friction-lining segments 33.1 and 33.2, and 43.1 and 43.2 respectively.

The respective lock mechanisms 34.1, 44.1, like the complementarily designed lock counter-mechanisms 35.2, 45.2, presently engage a clip having both a neck 34.1b, 35.2b, 44.1b, 45.2b supporting a head 34.1a, 35.2a, 44.1a, 45.2a and a groove 34.1c, 35.2c, 44.1c, 45.2c adjacent to this clip.

A plurality of stress-relief holes/openings are provided according to invention in the lock vicinity 37.1 in the exemplary embodiment shown in FIG. 4. Thus the rhombic head 34.1a of the first lock mechanism 34.1 demonstrates an opening 38.1 that basically traces the contour of head 34.1a. Moreover, a circular hole 38.3a is also located in the head 35.2a of the lock counter-mechanism 35.2. Finally, two triangular holes 38.1b and 38.1c, which surround the rhombic head 35.2a of the lock counter-mechanism 35.2 essentially in axial symmetry, are built into the lock mechanism 34.1 in the vicinity of the lock mechanism that is adjacent to groove 34.1c. These holes are preferably punched into the friction lining.

FIGS. 4 and 5 furthermore indicate with the help of arrows, how forces acting perpendicular to the surface of the respective friction linings 33, 43 deform the respective friction linings 33, 43 within the planes of those linings.

When compression forces act upon a portion of its surface, a deformable body will generally give way in the direction of its open surfaces that are not exposed to any forces. A friction-lining segment of the art described above will not behave differently.

In friction-lining segments 43.1, 43.2 in accordance with the state of the art (FIGS. 5a and 5b), expansion will consequently occur in the plane of the friction lining. This presses together the external boundaries of the adjacent lock mechanisms 44.1 and lock counter-mechanism of adjoining friction-lining segments 43.1, 43.2, finally leading to arching in the vicinity of the external boundaries and consequently to a mechanical stress that assists wear.

Friction-lining segments 33.1, 33.2 in accordance with the invention (FIGS. 4a and 4b) behave differently. Here too, expansion will occur in the plane of the friction lining 33 itself due to compression. But here the lining 33 can give way in the direction of specially built-in holes 38.1a, 381.b, 38.1c, 38.2a. The counterpressure operating horizontally (in the plane of the lining) in the vicinity of the adjacent external boundaries of lock mechanisms 34.1 and lock counter-mechanisms 35.2 is significantly reduced. Arching in this vicinity is largely excluded if the holes 38.1a, 38.1b, 38.1c, 38.2a are suitably arranged and elongated.

DESCRIPTION OF THE FIGURES

1 Disc
2 Carrier
3 Friction lining
3.1 First friction-lining segment
3.2 Second friction-lining segment
3.3 Third friction-lining segment
4.1 Clip of first friction-lining segment
4.2 Clip of second friction-lining segment
4.3 Clip of third friction-lining segment
5.1 Groove of first friction-lining segment
5.2 Groove of second friction-lining segment
5.3 Groove of third friction-lining segment
6.1 First lock
6.2 Second lock 6.3 Third lock
7.1 First lock vicinity
7.2 Second lock vicinity
7.3 Third lock vicinity
8.1 First opening
8.2 Second opening
8.3 Third opening
9.1 First storage space
9.2 Second storage space
9.3 Third storage space
13 Friction lining
13.1 First friction-lining segment
13.2 Second friction-lining segment
14.1 Clip of first friction-lining segment
14.1a Head of first clip
14.1b Neck of first clip
15.2 Groove of second friction-lining segment
16.1 First lock
17.1 First lock vicinity
18.1 First opening
23 Friction lining
23.1 First friction-lining segment
23.2 Second friction-lining segment
24.1 Clip of first friction-lining segment
24.1a Head of first clip
24.1b Neck of first clip
25.2 Groove of second friction-lining segment
26.1 First lock
27.1 First lock vicinity
28.1a First opening
28.1b Second opening
32 Carrier
33 Friction lining
33.1 First friction-lining segment
33.2 Second friction-lining segment
34.1 Lock mechanism of first friction-lining segment
34.1a Head of first lock mechanism
34.1b Neck of first lock mechanism
34.1c Groove of first lock mechanism
35.2 Lock counter-mechanism of second friction-lining segment
35.2a Head of second lock counter-mechanism
35.2b Neck of second lock counter-mechanism
35.2c Groove of second lock counter-mechanism
36.1 First lock
37.1 First lock vicinity
38.1a First opening
38.1b Second opening
38.1c Third opening
38.2a Fourth opening
42 Carrier
43 Friction lining
43.1 First friction-lining segment
43.2 Second friction-lining segment
44.1 Lock mechanism of first friction-lining segment
44.1a Head of first lock mechanism
44.1b Neck of first lock mechanism
44.1c Groove of first lock mechanism
45.2 Lock counter-mechanism of second friction-lining segment
45.2a Head of second lock counter-mechanism
45.2b Neck of second lock counter-mechanism
45.2c Groove of second lock counter-mechanism
46.1 First lock
47.1 First lock vicinity

Figure 1:
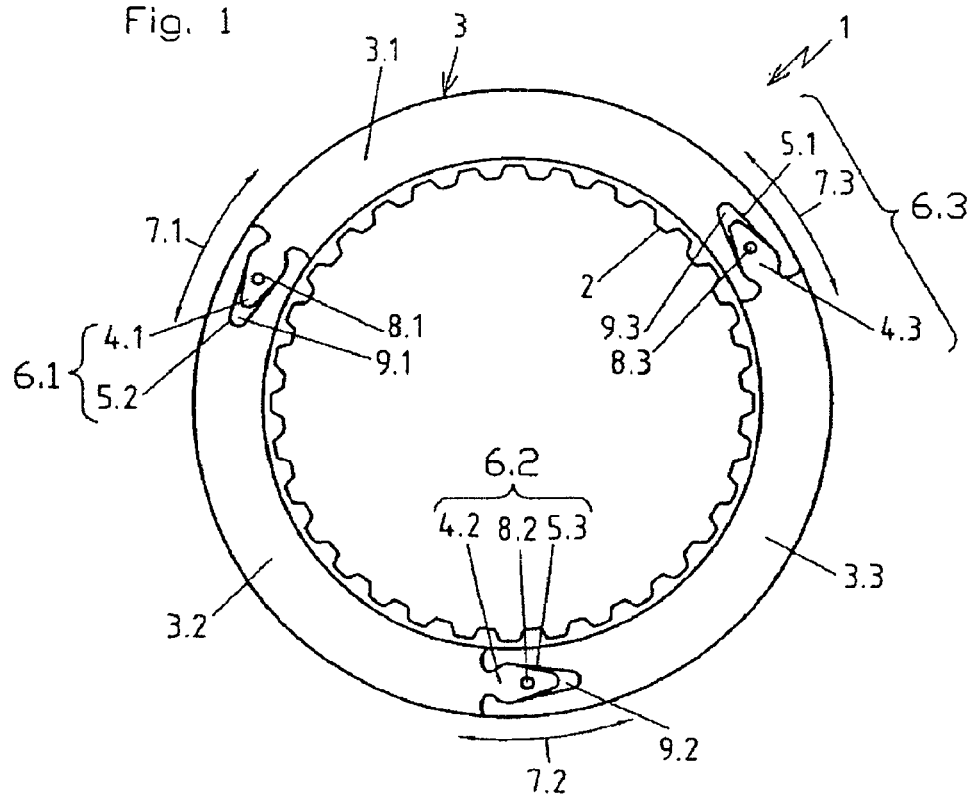
Figure 2:
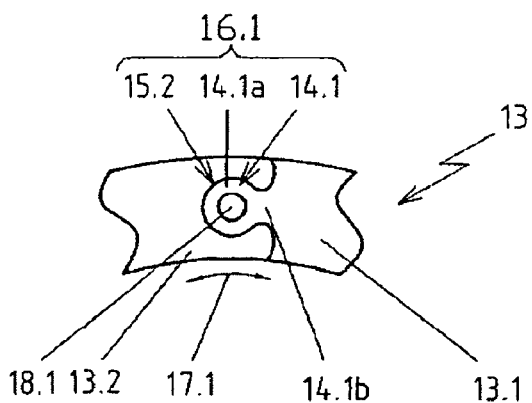
Figure 3:
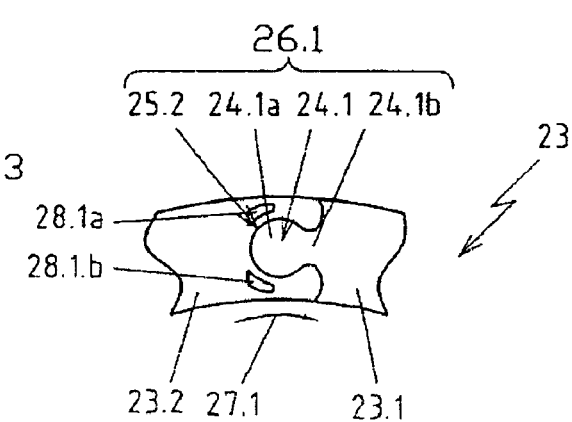

We claim:

1. Friction-lining segment (3.1, 3.2, 3.3; 13.1, 13.2; 23.1, 23.2; 33.1, 33.2) for a segmented friction lining (3, 13, 23, 33) of a friction plate (1) for a brake or clutch with a lock mechanism (4.1, 4.2, 4.3; 14.1; 24.1; 34.1) arranged on one end and/or with a lock counter mechanism (5.1, 5.2, 5.3; 15.2; 25.2; 35.2) arranged on the other end characterized in that said lock mechanism (34.1) and/or said lock counter mechanism (35.2) demonstrates a clip (4.1, 4.2, 4.3; 14.1,; 24.1; 34.1a, 34.1b; 35.2a, 35.2b) characterized in that said clip (4.1, 4.2, 4.3; 14.1, 24.1, 34.1a, 34.1b, 35.2a, 35.2b) demonstrates a neck (14.1b; 24.1b; 34.1b, 35.2b) and a head (14.1a; 24.1a; 34.1a, 35.2a) and that at least one hole (8.1, 8.2, 8.3; 18.1; 38.1a, 38.2a) is located in said head (14.1a, 24.1a; 34.1a, 35.2a), said at least one hole (8.1, 8.2, 8.3; 18.1, 38.1a, 38.2a) demonstrates an outside contour which essentially corresponds to the outside contour of said head (14.1a, 24.1a; 34.1a, 35.2a).

2. Friction-lining segment according to claim 1, characterized in that said head (34.1a, 35.2a) is designed rhombic and demonstrates at least one hole (38.1a) with an ellipse-shaped outside contour.

3. Friction lining (3, 13, 23, 33) of a friction plate for a brake or clutch,
having at least a first and a second friction-lining segments (3.1, 3.2, 3.3; 13.1, 13.2; 23.1, 232; 33.1/33.2 adjoining each other on at least one end,
wherein
on a end adjoining one end of said second friction-lining segment (3.1, 3.2, 3.3; 13.1, 13.2; 23.1, 23.2; 33.1, 33.2), said first friction-lining segment (3.1, 3.2, 3.3; 13.1, 13.2; 23.1, 23.2; 33.1, 33.2) demonstrates a lock mechanism (4.1,4.2,4.3; 14.1; 24.1; 34.1), which
connects to a lock counter-mechanism (5.1, 5.2, 5.3; 15.2; 25.2; 35.2) arranged on the adjoining end of said second friction-lining segment (3.1, 3.2, 3.3; 13.1, 13.2; 23.1, 23.2; 33.1, 33.2), forming a lock (6.1,6.2, 6.3; 16.1; 26.1; 36.1);
characterized in that
at least one hole (8.1, 8.2, 8.3; 18.1; 28.1a, 28.1b; 38.1a, 38.1b, 38.1c, 38.2a) is provided in a vicinity (7.1, 7.2, 7.3; 17.1; 27.1; 37.1) of said lock (6.1, 6.2, 6.3; 16.1; 26.1; 36.1) and at least one other hole is provided in the vicinity of said lock counter-mechanism whereby the at least one hole in the lock mechanism and the at least one other hole in the lock counter-mechanism increase the elasticity of the friction lining in the vicinity of the lock to reduce stress on the friction lining in the area of the lock.

4. Friction lining (3, 13, 23, 33) of a friction plate for a brake or clutch,
having at least a first and a second friction-lining segments (3.1, 3.2, 3.3; 13.1, 13.2; 23.1, 23.2; 33.1, 33.2) adjoining each other on at least one end,
wherein
on a end adjoining one end of said second friction-lining segment (3.1, 3.2, 3.3; 13.1, 13.2; 23.1, 23.2; 33.1, 33.2), said first friction-lining segment (3.1, 3.2, 3.3; 13.1, 13.2; 23.1, 23.2; 33.1, 33.2) demonstrates a lock mechanism (4.1,4.2,4.3; 14.1; 24.1; 34.1), which
connects to a lock counter-mechanism (5.1, 5.2, 5.3; 15.2; 25.2; 35.2) arranged on the adjoining end of said second friction-lining segment (3. 1, 3.2, 3.3; 13.1, 13.2; 23.1, 23.2; 33.1, 33.2), forming a lock (6.1, 6.2, 6.3; 16.1; 26.1; 36.1);

characterized in that
> at least one hole (8.1, 8.2, 8.3; 18.1; 28.1*a*, 28.1*b*; 38.1*a*, 38.1*b*, 38.1*c*, 38.2*a*) is provided in a vicinity (7.1, 7.2, 7.3; 17.1; 27.1; 37.1) of said lock (6.1, 6.2, 6.3; 16.1; 26.1; 36.1);

characterized in that
> said lock mechanism (34.1) demonstrates a clip (4.1, 4.2, 4.3; 14.1; 24.1; 34.1*a*, 34.1*b*) having a neck (14.1*b*, 24.1*b*, 34.1*b*) and a head (14.1*a*, 24.1*a*, 34.1*a*), and that
> said lock counter-mechanism (35.2) demonstrates a groove (5.1, 5.2, 5.3; 15.2; 25.2; 34.1*c*, 35.2*c*) which accommodates said clip (4.1, 4.2, 4.3; 14.1; 24.1; 34.1*a*, 34.1*b*) having said neck (14.1*b*, 24.1*b*, 34.1*b*) and said head (14.i*a*, 24.1*a*, 34.1*a*) essentially with positive fit, and that
> said head (14.1*a*, 24.1*a*, 34.1*a*) demonstrates the at least one hole (8.1, 8.2, 8.3; 18.1; 38.1*a*).

5. Friction lining according to claim 4, characterized in that at least one other hole (28.1*a*, 28.1*b*; 38.1*b*, 38.1*c*) is provided in the vicinity of said lock counter-mechanism (35.2) adjoining said groove (5.1, 5.2, 5.3; 15.2; 25.2; 34.1*c*, 35.2*c*).

6. Friction lining according to claim 4 characterized in that
> said lock counter-mechanism (35.2) demonstrates a clip having a neck (35.2*b*) and a head (35.2*a*), and that
> said lock mechanism (34.1) demonstrates a groove (34.1*c*), which accommodates said clip having said neck (35.2*b*) and said head (35.2*a*) essentially with positive fit, and that
> said head (35.2*a*) demonstrates at least one other hole (38.2*a*).

7. Friction-plate (1) having a carrier (2, 32), and having at least one friction lining (3, 13, 23, 33) arranged on at least one end face of said carrier (2, 32) in accordance with claim 3.

8. Friction lining according to claim 5, characterized in that
> said lock counter-mechanism (35.2) demonstrates a clip having a neck (35.2*b*) and a head (35.2*a*), and that
> said lock mechanism (34.1) demonstrates a groove (34.1*c*), which accommodates said clip having said neck (35.2*b*) and said head (35.2*a*) essentially with positive fit, and that
> said head (35.2*a*) demonstrates at least one other hole (38.2*a*).

9. Friction plate (1) having a carrier (2, 32), and having at least one friction lining (3, 13, 23, 33) arranged on at least one end face of said carrier (2, 32) in accordance with claim 4.

10. Friction plate (1) having a carrier (2, 32), and having at least one friction lining (3, 13, 23, 33) arranged on at least one end face of said carrier (2, 32) in accordance with claim 5.

11. Friction plate (1) having a carrier (2, 32), and having at least one friction lining (3, 13, 23, 33) arranged on at least one end face of said carrier (2, 32) in accordance with claim 6.

12. Friction plate (1) having a carrier (2, 32), and
> having at least one friction lining (3, 13, 23, 33) arranged on at least one end face of said carrier (2, 32) in accordance with claim 8.

* * * * *